(12) United States Patent
Gudmundsson et al.

(10) Patent No.: US 12,443,617 B1
(45) Date of Patent: Oct. 14, 2025

(54) SYSTEMS AND METHODS FOR RECORDING AND UPDATING DATA IN A DATABASE

(71) Applicant: VERIZON PATENT AND LICENSING INC., Basking Ridge, NJ (US)

(72) Inventors: Agust K. Gudmundsson, Castle Rock, CO (US); Sheikbharith Liakathali, Frisco, TX (US); John Nield Hankins, Philadelphia, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/677,980

(22) Filed: May 30, 2024

(51) Int. Cl.
G06F 7/00 (2006.01)
G06F 16/25 (2019.01)

(52) U.S. Cl.
CPC .................. G06F 16/254 (2019.01)

(58) Field of Classification Search
CPC ...................................... G06F 16/254
USPC .................................................. 707/600–899
See application file for complete search history.

(56) References Cited

U.S. PATENT DOCUMENTS

2019/0372924 A1* 12/2019 Waltz .................. G06F 16/2282

* cited by examiner

Primary Examiner — Isaac M Woo

(57) ABSTRACT

Disclosed are systems and methods for a computerized framework that involves a state machine for multi-threaded, multi-step task extraction that is configured to operate by implementing a suite of tables and corresponding views that do not require any updates and/or data copying, which allows for additional states being adopted for disparate processing regimes. The state machine enables insertions of transactional usage records into several tables in a data warehousing environment, where jobs in the table can be configured to identify the job name along with other key information for how to process such job, as well as information related to what kind of identifier (ID) to use and rules for retry and/or error handling. The framework allows multiple threads to work on subsets of data in a single table and update the status of many records while they are in-flight.

20 Claims, 5 Drawing Sheets

SYSTEMS AND METHODS FOR RECORDING AND UPDATING DATA IN A DATABASE

BACKGROUND INFORMATION

A database is an organized collection of data that is stored and accessed electronically. Databases are designed to efficiently store, retrieve and manage large amounts of information, ensuring data integrity and quick access. Databases can accommodate flexible data models, and a wide range of querying, updating and administrating operations making them fundamental to applications and systems that require reliable data management and processing.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF EXAMPLE EMBODIMENTS

Figure 1:
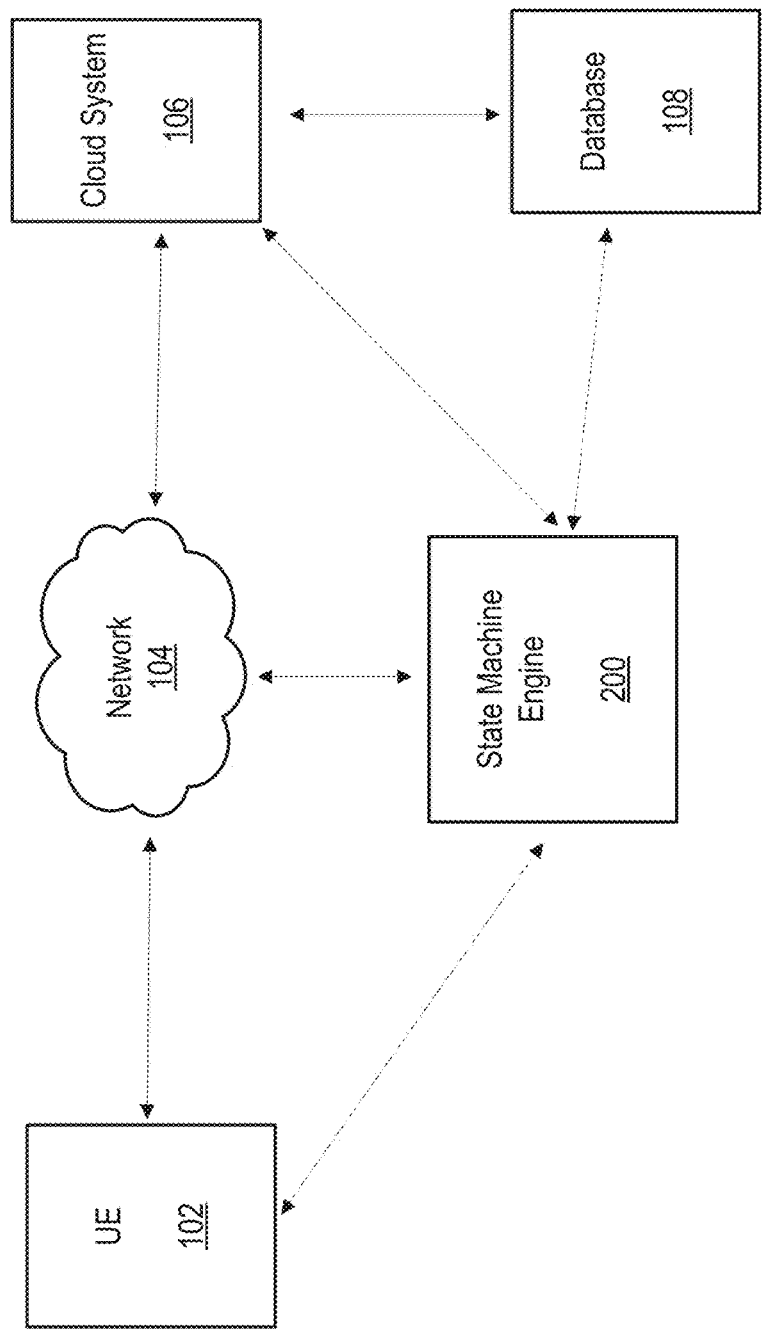
FIG. 1 is a block diagram of an example network architecture according to some embodiments of the present disclosure.

Databases with prolonged in-flight periods, inclusive of columnar databases (e.g. BigQuery, for example) are configured to store and update information for transactional processing purposes. Such databases can be efficient at storing tremendous amounts of static data that seldom needs updating. This allows for fast read access across large data sets for reporting and data warehouse applications, which can provide tools for transactional processing as such data is often kept in memory and available for reading. However, such data cannot be updated as it is considered "in flight." This is especially common in Cloud-based Platform as a Service (PaaS) databases. Thus, with conventional databases, transactional processing is problematic and requires long intervals between updates (e.g., minutes, hours, and the like).

Accordingly, to that end, the disclosed systems and methods provide mechanisms that enable functionality for rapid, albeit limited, transactional processing on such in flight records. As discussed in more detail below, the disclosed mechanisms can enable the performance of de facto updates to inflight records prior to their committal to safe store. This, among other benefits, can, in effect, allow limited but critical, transactional like capabilities to a PaaS database, for example.

According to some embodiments, the disclosed systems and methods provide a computerized framework that can operate to extract international usage from a data warehousing database(s), construct files that are needed to be compressed, and then ship and/or provide such compressed, constructed files to a vendor (or third party entity), whereby the information in the files can be utilized to prevent fraudulent usages and/or activities.

Some databases (e.g. BigQuery® or the like) contain capabilities for insertion of data by multiple threads from disparate sources at efficient processing speeds. For example, insertions can be initially cached in memory, then committed to storage afterwards. Once inserted into memory, the insertions can be read by those with access rights; however, updates to such insertions cannot occur until they are committed to storage (e.g., disk). Systems that generate significant amounts of data (e.g., 500-600 million records per day) require use of databases that allow for fast insertion and fast access reading of the stored records. Updating these records are generally a secondary concern, but can become significant hurdles as the systems grow more sophisticated and encompass more functionality over time.

As these systems grow, transaction processing and updating becomes unreliable and static (e.g., inflight records are unable to be processed). Indeed, the delay from insertion to the memory to storage can vary from seconds to hours, which even on the short side, is ample time for updates to be required and/or instances of data infidelity to occur.

Fraud processing systems are examples of systems where processing and/or moving large numbers of transaction records is required. Such processing, however, can become a cumbersome task, which can reduce efficiency and lead to data unavailability for periods of time (e.g., while data is "in flight" or "in transit"), in that multiple steps of post-processing for extraction and insertion may be required. Current known method of addressing this concern may involve introducing mandated delays between updating and reading a record. This, among other drawbacks, can be expensive, duplicative and lead to complicated and expensive processing that is a drain to the database and/or associated system relying on the database's resources.

Accordingly, the disclosed systems and methods provide a state machine framework for multi-threaded, multi-step task extraction. A state machine is a computational model that comprises a set of states, input events, transitions between states, and actions associated with those transitions. As discussed herein, the disclosed state machine framework can be utilized to control the logging process of data securely held in databases (e.g., data blocking, and extract, transform, load (ETL) process, and the like). According to some embodiments, as discussed herein, the disclosed framework can operate to extract certain records, for example, calls made internationally, that have been inserted since the last interval and format them into a file (e.g., where the file then needs to be compressed and then sent to a remote fraud processing system). As provided herein, the disclosed processing can be operative to minimize missing records, reduce duplicative processing and/or record production, and avoid interference with ongoing insertions. Indeed, the disclosed mechanisms enable the restarting of processing at any state if/when an unforeseen error (e.g., network outage, disk full, and the like) occurs, which operate without the need for repeating previous states.

According to some embodiments, the disclosed framework involves a state machine for multi-threaded, multi-step task extraction that is configured to operate by implementing a suite of tables and corresponding views that do not require any updates and/or data copying, which allows for additional states being adopted for disparate processing regimes. The disclosed state machine further enables insertions of transactional usage records into several tables in a database, e.g., a data warehousing environment, where jobs in the table can be configured to identify the job name along with other key information for how to process such job, as well as information related to what kind of identifier (ID) to use and rules for retry and/or error handling. As provided herein, the insertions can correspond to, but are not limited to, data arriving from many disparate cell towers, ordering systems, ancillary systems, and the like, and can be inserted at a constant rate (proportional to which they are received).

Accordingly, in some embodiments, as discussed herein, the disclosed systems and methods provide many distinct advantages and benefits; for example, the disclosed framework allows multiple threads to work on subsets of data in a single table and update the status of many records while they are in-flight. In some embodiments, such a single table approach provides functionality for visibility of the previous jobs, so that extracts do not find duplicate records and/or miss any records.

With reference to FIG. 1, system 100 is depicted which includes user equipment (UE) 102, network 104, cloud system 106, database 108, and state machine (SM) engine 200. It should be understood that while system 100 is depicted as including such components, it should not be construed as limiting, as one of ordinary skill in the art would readily understand that varying numbers of UEs, engines, cloud systems, databases and networks can be utilized; however, for purposes of explanation, system 100 is discussed in relation to the example depiction in FIG. 1A.

According to some embodiments, UE 102 can be any type of network device, as discussed above. In some embodiments, for example, UE 102 can include, but not be limited to, a mobile phone, tablet, laptop, game console, smart television (TV), Internet of Things (IoT) device, wearable device, an autonomous vehicle (AV), autonomous machine, unmanned aerial vehicle (UAV), and/or any other device equipped with a cellular or wireless or wired transceiver.

In some embodiments, network 104 can be any type of network, such as, but not limited to, a wireless network, cellular network, the Internet, and the like (as discussed above). Network 104 facilitates connectivity of the components of system 100, as illustrated in FIG. 1A. Further discussion of embodiments of network 104 are provided below with reference to FIG. 5.

According to some embodiments, cloud system 106 may be any type of cloud operating platform and/or network-based system upon which applications, operations, and/or other forms of network resources may be located. For example, system 106 may be a service provider and/or network provider from where services and/or applications may be accessed, sourced or executed from. For example, system 106 can represent the cloud-based architecture associated with a cellular provider, which has associated network resources hosted on the internet or private network (e.g., network 104), which enables (via engine 200) the location determination operations discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or engine 200).

In some embodiments, for example, cloud system 106 can provide a private/proprietary management platform, whereby SM engine 200, discussed infra, corresponds to the novel functionality system 106 enables, hosts and provides to a network 104 and other devices/platforms operating thereon.

According to some embodiments, database 108 may correspond to a data storage for a platform (e.g., a network hosted platform, such as cloud system 106, as discussed supra) or a plurality of platforms. Database 108 may receive storage instructions/requests from, for example, SM engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

SM engine 200, as discussed above and further below in more detail, can include components for the disclosed functionality. According to some embodiments, SM engine 200 may be a special purpose machine or processor, and can be hosted by a device (or component) on network 104, within cloud system 106 and/or on UE 102. In some embodiments, SM engine 200 may be hosted by a server and/or set of servers associated with cloud system 106.

According to some embodiments, SM engine 200 may be configured to implement and/or control a plurality of services and/or microservices, where each of the plurality of services/microservices are configured to execute a plurality of workflows associated with performing the disclosed connection management. Non-limiting embodiments of such workflows are provided below.

According to some embodiments, SM engine 200 may function as an application provided by and/or hosted by cloud system 106. In some embodiments, SM engine 200 may function as an application installed on a server(s), network location and/or other type of network resource associated with system 106. In some embodiments, such application may be a web-based application accessed by UE 102. In some embodiments, SM engine 200 may be configured and/or installed as an augmenting script, program or application (e.g., a plug-in or extension) to another application or program provided by cloud system 106 and/or executing on UE 102.

Figure 2:
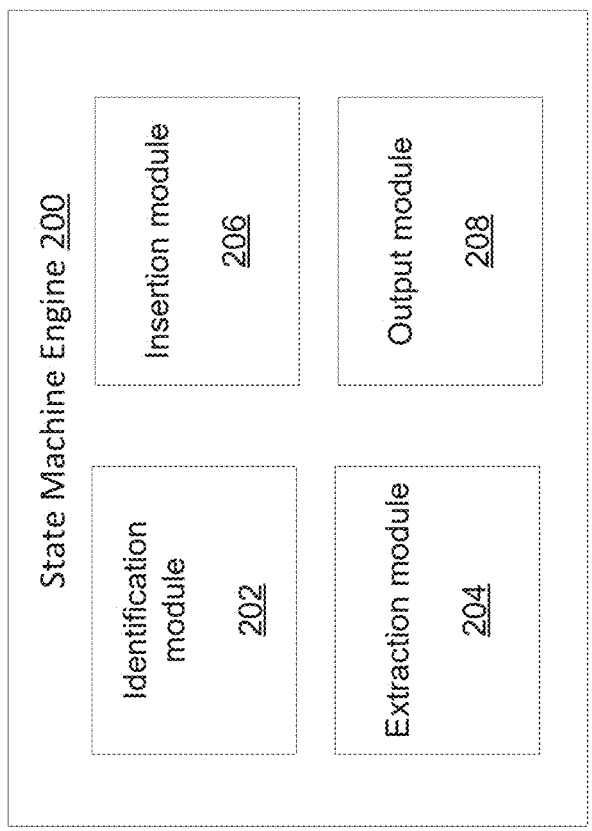
FIG. 2 is a block diagram illustrating components of an exemplary system according to some embodiments of the present disclosure.

As illustrated in FIG. 2, according to some embodiments, SM engine 200 includes identification module 202, extraction module 204, insertion module 206 and output module 208. It should be understood that the modules discussed herein are non-exhaustive, as additional or fewer modules (or sub-modules) may be applicable to the embodiments of the systems and methods discussed. More detail of the operations, configurations and functionalities of SM engine 200 and each of its modules, and their role within embodiments of the present disclosure will be discussed below.

Figure 3:
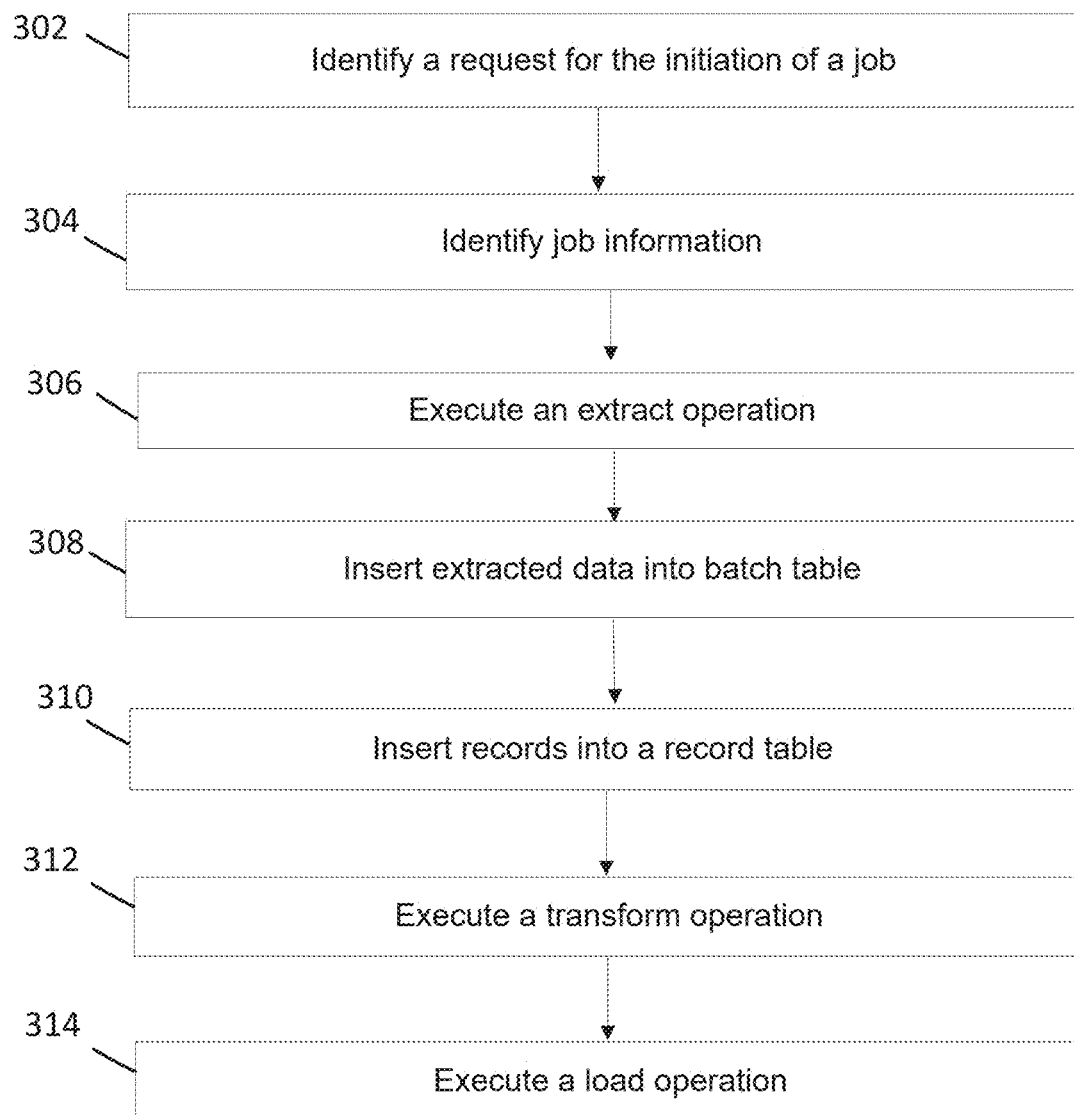
FIG. 3 illustrates an exemplary workflow according to some embodiments of the present disclosure.

In FIG. 3, Process 300 provides non-limiting example embodiments for a mechanical state machine that uses a suite of tables and corresponding views that do not require any updates and/or data copying, and allows for additional states being easily adopted for disparate processing regimes.

According to some embodiments, Steps 302 and 304 of Process 300 can be performed by identification module 202 of SM engine 200; and Step 306 can be performed by extraction module 204; Steps 308 and 310 can be performed by insertion module 206; and Step 312 and 314 can be performed by output module 208. According to some embodiments, each module operates, as discussed below, by logging the state their operation begins with and logs the state its operation exits on. Such logging can be recorded in database 108, and the artifact of each module's operation can be inserted in the batch log, as discussed supra. In some embodiments, types of database operations (e.g., insertion calls, for example) can be dependent upon the state of operation of a respective module (202-208); therefore, such logging of the state of the module upon its initiation and exit enables subsequent module operations and state-based operations to operate more efficiently and accurately.

According to some embodiments, Process 300 begins with Step 302 where a request to initiate a job is received. In some embodiments, as discussed herein, a job is a data structure or executable operation that defines a set of data from disparate in-flight tables that may need to be shipped to a remote system (or at least a separate destination). In some embodiments, a job can correspond to a batch, which is an allotment of time that data is being extracted from disparate sources. In some embodiments, multiple batches can be running for a single job. In some embodiments, a job can be made up of multiple steps that are to happen in sequence, and even though they read from the same source and write to the same destination, they must not block each other from running. In some embodiments, engine 200 (e.g., module 202) can provide functionality to check for and avoid running duplicate operations of specific modules. As discussed herein, this can be utilized when a restart at a specific state is being performed, for example.

According to some embodiments, for example, one common job for a state machine is managing the extract, transform, load (ETL) process. According to some embodiments, as provided herein, engine 200 can initiate the extraction process, where data is fetched from various sources such as transactional databases, external application program interface (APIs), or flat files. Once the data is extracted, the data can be transformed into a format suitable for analysis and storage in a data warehouse (e.g., database 108). In some embodiments, as discussed herein, engine 200 can manage the transformation steps, which can involve, but are not limited to, data cleaning, normalization, aggregation, enrichment, and the like, or some combination thereof. After transformation, the data is loaded into the data warehouse, where engine 200 can oversee such processing, thereby ensuring that the data is loaded efficiently and accurately into the appropriate tables and/or data structures within the warehouse.

Accordingly, throughout such stages, engine 200 can maintain the state of each data processing task, track dependencies between tasks, and handle any errors and/or exceptions that may occur during the ETL process. Additionally, engine 200 can coordinate parallel processing of data to improve performance and scalability. Thus, as provided herein, engine 200 can act as a central controller for the ETL workflow, orchestrating the various tasks involved in data processing and ensuring the integrity and consistency of the data within the database(s). Therefore, in some embodiments, engine 200 controls the coordination of the job by recording the states of a state machine (as per engine 200, discussed above) in the batch log.

In Step 304, engine 200 can identify the job information (from the initiated job from Step 302). Such job information can include, but is not limited to, the unique ID of the job, ID of batch; job name, timestamp of the job/batch (and/or records to be processed—for example, start and end time variables) location, type of data, quantity of data, requested data, origin of data, destination of data, operations to be performed on the data (e.g., types of transformations, for example), and the like. As provided below, the job information can be used to identify locations, sources and/or types of data to extract and insert into a database.

In Step 306, engine 200 can execute an extract operation in response to the initiation of the job request. As provided herein, the processing in Step 306 can involve retrieving and extracting data from one or more source systems and inserting the extracted data into the data integration environment. As discussed above, such extraction is in accordance with the job information (e.g., start time/end time), which can be recorded in the batch file, as discussed herein. Accordingly, the extraction discussed herein can involve identifying the sources from which data needs to be extracted (via the job information). These sources can include databases, flat files, APIs, cloud services, streaming sources, cell tower logs, and the like. Once the data sources are identified, the engine 200 can establish connections to these sources. This involves configuring connection parameters such as server addresses, authentication credentials and access permissions. After establishing connections, engine 200 can execute queries and/or data extraction commands to retrieve the required data from the source systems. The queries may range from simple SELECT statements in the case of databases to more complex API calls or file parsing operations for other types of sources (e.g., PaaS databases, for example).

In some embodiments, the source systems contain a large volume of data, but only a subset of it is relevant for the job. Thus, the extract operation in Step 306 may involve filtering and selecting specific data based on predefined criteria or query conditions. In some embodiments, depending on the nature of the data sources, different extraction techniques may be employed—for example, such techniques can include, but are not limited to, full extraction (where all data is extracted every time), incremental extraction (where only new or modified data since the last extraction is retrieved), and the like, or some combination thereof.

In some embodiments, as the extracted data is retrieved from the source systems, engine 200 can stage and/or temporarily store the data in a staging area (e.g., short-term memory, for example). Such staging area serves as an intermediate storage location where the extracted data undergoes preprocessing before being transformed and loaded into the data warehouse. Indeed, in some embodiments, throughout the extract operation, error handling mechanisms can be implemented via engine 200 to detect and handle any issues that may arise during data extraction, which can include, but are not limited to, connectivity errors, data format mismatches, and/or any other exceptions that may occur during the extraction process. Moreover, alongside the extracted data, metadata such as, but not limited to, data source information, extraction timestamps, and other relevant details may also be collected and stored. Such metadata can provide context and lineage information about the extracted data, which is valuable for data governance and audit purposes, as well as batch processing, discussed infra.

Accordingly, for example, once a job starts, the SM engine 200 inserts extracted data into a batch_log table, along with the unique id of the job and the jobs name, where each extracted data is extracted from the start of the previous batch for the same job, until the start time of the current batch. In some embodiments, therefore, the extract operation can involve extracting batch data (for use via Step 308, discussed infra) and extracting corresponding records (or records data) (for use via Step 310, discussed infra).

In Step 308, engine 200 can insert the extracted data (e.g., job data) into a batch table. And, in Step 310, engine 200 can insert the extracted records data (from the extracted job data) into a records table. In some embodiments, a batch_id can be part of the records table; in some embodiments, the batch_id can be attached to the extracted record, such that several jobs can be inserted into the same table at the same time and each of the batches can advance independently. In some embodiments, the records table can be a transient table, where the records table is a temporary table for use by the batch table that is leveraged until the transformation and load processing is performed, as discussed infra.

Accordingly, as per Steps 308 and 310, once the extract operation in Step 306 is completed, a single record is written into the batch_log table (Step 308) to advance the state (i.e. the status) of all the records in the transient table (Step 310) for just that batch, without doing any updates. This assures that the status is applied to all the records in the transient table, even if they are in flight (e.g., in other words, an update without an actual update). In some embodiments, this can be accomplished because the actual query of the transient table is not directly against the table but a view that joins every record to the most recent batch log status.

According to some embodiments, the processing performed via Steps 306-310 can be performed for all subsequent extract operations. That is, once a file is created, a single insert to the batch log advances the job. If for any reason an error occurs in that step, an alternate error state can be inserted, which provides functionality for "retry" processes (e.g., reperform) to attempt to re-run the job at a later time, without interrupting other jobs that are running. That is, in some embodiments, the job is not retried from the beginning; however, the individual step can be rerun without repeating the previous steps of the job. For example, if the last copy step fails, only the copy step needs to be retried, not the previous extract, file, compress and other steps that proceeded the copy step. Thus, in some embodiments, the batch_log can be configured to start at different points, dependent on the operating state of the job.

Continuing with Process 300, engine 200 can then perform Step 312, where the data/records can be transformed, as discussed above. In some embodiments, the data being transformed can correspond to the data related to and/or constituting the records in the records/transient table. According to some embodiments, the transform operation occurs once the extracted data is processed, it can be cleaned and enriched to make it suitable for storage and usage.

In some embodiments, a transform operation can involve data cleansing, where the extracted data is inspected for inaccuracies, inconsistencies, or missing values. Cleansing involves tasks such as removing duplicate records, correcting spelling errors, standardizing formats, and filling in missing values using imputation techniques. After cleansing, the data can be subject to validation processing to ensure its integrity and conformity to predefined rules or constraints. This involves checking for outliers, anomalies, or data quality issues that could affect the reliability of the data for analysis.

In some embodiments, data from multiple source systems may need to be integrated or combined to create a unified view of the data. Thus, in Step 312, engine 200 can perform tasks such as, but not limited to, joining datasets, merging records (and/or compressing) and/or resolving conflicts between data from different sources.

According to some embodiments, Step 312's transform operations involve transforming the structure and/or format of the data to meet the requirements of the target data warehouse. This may involve, for example, reshaping data into a star or snowflake schema, converting data types, renaming columns, applying business rules for data standardization, and the like, or some combination thereof.

In some embodiments, Step 312 may further involve operations for aggregation and summarization of data to produce higher-level insights, which can include, but are not limited to, grouping data into meaningful categories, calculating summary statistics and/or generating aggregated reports for analysis.

Accordingly, in some embodiments, Step 312 can involve a series of tasks including, but not limited to, cleansing, validation, integration, enrichment, transformation, aggregation, filtering, error handling and metadata management to ensure the quality, integrity and usability of the transformed data.

And, in Step 314, engine 200 can execute a load operation based on the transformation operation in Step 312. According to some embodiments, the load phase is the final step where the transformed and processed data can be loaded into the target data warehouse. Step 314 can involve several key activities to ensure the efficient and accurate loading of data.

According to some embodiments, the transformed data from Step 312 can be prepared for loading into the data warehouse. This may involve organizing the data into appropriate structures, such as tables or dimensional models, to align with the schema of the target database. Next, the data loading process can be initiated, where the transformed data is transferred from the staging area or temporary storage to the target database. This transfer can be performed using various known or to be known mechanisms, including, but not limited to, bulk loading techniques, batch processing, real-time streaming, and the like, depending on the volume and velocity of the data.

In some embodiments, during the loading process, data integrity checks and validation rules can be enforced to ensure that only high-quality and consistent data is loaded into the data warehouse. In some embodiments, this can assist in maintaining the integrity and reliability of the data for downstream analysis and reporting.

In some embodiments, engine 200 can implement concurrency control mechanisms to manage simultaneous data loading operations and prevent conflicts or inconsistencies in the target database. As provided herein, this can ensure that data is loaded efficiently and without disruption to ongoing analytical processes.

Additionally, error handling and logging mechanisms can be implemented to capture any issues and/or exceptions that may occur during the data loading process. For example, an error can correspond to, but not be limited to, a network outage, bandwidth at or below a threshold, a disk being full, and the like. In another non-limiting example, this can include handling data validation errors, integrity constraints violations and/or connectivity issues with the target database.

Accordingly, in some embodiments, once the data loading process is complete, metadata about the loaded data, such as loading timestamps, source information, and data lineage, may be recorded for documentation and audit purposes. Such metadata can provide a context and traceability for the loaded data, aiding in data governance and compliance efforts.

By way of a non-limiting example, the below Tables 1-7 provide an example of the processing and table usage via SM engine 200. It should be understood that the types of tables, column and/or row information, as well as data included therein, are provided for example purposes, and are not to be construed as limiting.

In Table 1, a customer table is provided, which provides cell tower data for a set of customers, as identified by their customer IDs:

| Customer Table |||||| |
|---|---|---|---|---|---|
| CustID | MDN | Name | Address | . . . | Status |
| 1234 | 9085551234 | John Doe | 123 Main St | | Active |
| 2355 | 3034441234 | Mary Smith | 321 Oak Ave | | Active |

For each customer, call detail data can be retrieved, via call detail table (Table 2):

| Call Detail Table |||||||||
|---|---|---|---|---|---|---|---|---|
| CustID | EventTS | Duration | CellID | . . . | Originating | Terminating | Roaming | . . . |
| 1234 | Mar. 5, 2024 00:45:24 | 5:15 | 0x0205A0 | | 9085551234 | 9085551212 | NJ | In |
| 1234 | Mar. 5, 2024 01:45:24 | 1:15 | 0x0205A0 | | 9085551212 | 9085551234 | NYC | Out |
| 1234 | Mar. 5, 2024 15:45:24 | 10:15 | 0x0205A0 | | 9085551212 | 9085551234 | France | Out |
| 2355 | Mar. 5, 2024 00:55:24 | 5:15 | 0x0205A0 | | 9085551234 | 3034441234 | CO | In |
| 2355 | Mar. 5, 2024 01:5524 | 1:15 | 0x0205A0 | | 3034441234 | 9085551234 | CO | Out |
| 2355 | Mar. 5, 2024 15:45:24 | 05:15 | 0x0205A0 | | 3034441234 | 3035551234 | France | Out |

And, for each customer, international ("INTL") voice data can be retrieved, which can begin from different timestamps (ProcessTS) (Table 3):

| INTL_VOICE ||||||||
|---|---|---|---|---|---|---|---|
| CustID | Originating MDN | Terminating MDN | Duration | Event Date | Event Time | ProcessTS | BatchID |
| 1234 | 9085551212 | 9085551234 | 10:15 | Mar. 5, 2024 | 05:45:24 | Mar. 6, 2024 00:30:15 | 1001 |
| 2355 | 3034441234 | 3035551234 | 5:15 | Mar. 5, 2024 | 15:45:24 | Mar. 6, 2024 00:30:15 | 1001 |

As well as INTL data (Table 4):

INTL_DATA

| CustID | Bytes | Event Date | Event Time | ProcessTS | BatchID |
|---|---|---|---|---|---|
| 1234 | 35 mb | Mar. 5, 2024 | 05:30:24 | Mar. 6, 2024 00:30:15 | 1001 |
| 2355 | 15 Mb | Mar. 5, 2024 | 15:30:24 | Mar. 6, 2024 00:30:15 | 1001 |

Accordingly, from the above information/tables, which can serve as source information or job information/data, as discussed above, the below table, via Steps 308-310, can be configured and/or inserted into (e.g., batch table, for example) (Table 5):

Extract_configuration

| Name | ID_TYPE | Bucket | File_name | upload path | Extract_SQL | Delimiter | Frequency | auto_launch | ReTries |
|---|---|---|---|---|---|---|---|---|---|
| INTL_VOICE | EPOCH SEQ | gs://<> | IVOIVE.txt | MAX upload directory | ( . . . ) | \| | 4 5 * * * 0, 15, 30, 45 * * * * | Y/N/O | 3 |
| INTL_DATA | EPOCH | gs://<> | IVOIVE.txt | MAX upload directory | ( . . . ) | \| | 4 5 * * * | V/N/O | 3 |

Where, the event log can correspond to a records table, for example, that can be transformed and loaded (Table 6):

Event_log

| BatchID | Name | State | ProcessTS | TableName |
|---|---|---|---|---|
| 1001 | INTL_VOICE | NEW | Mar. 6, 2024 00:30:25 | Voice |
| 1001 | INTL_DATA | NEW | Mar. 6, 2024 00:30:28 | Data |

In some embodiments, upon identification of an error, such table below can be compiled for "retry" purposes, as discussed above (Table 7):

Error_log

| batch_id | state | error_text | Processts |
|---|---|---|---|
| 121000000 | EXTRACT | current_timestamp | Data |

Accordingly, as discussed above, Process 300 provides computational steps for a state machine to record operational values of database processing into a log that is applied and updated as data records are retrieved/extracted, analyzed, transformed and loaded into the desired locations. As discussed above, the disclosed steps of Process 300 can operate according to different states of the state machine, whereby processing can proceed according to the tasks of a job without having to revisit certain states when certain tasks are required to be retried and/or repeated. That is, the disclosed operations can enable updates to be realized for "in flight" data, thereby allowing a job to complete for which the state of the multiple records at multiple times can be posted to stasis. Thus, via the disclosed capabilities, new jobs can be "installed" by adding new rows to batch configuration tables and running a job schedule (where the new records/data can be populated therein), rather than developing new scripts for new requests. This can also free up critical resources to maximize utilization, while ensuring improved efficiency and accuracy. For example, existing systems may perform ETL operations once per day; whereas, via the disclosed mechanisms, such operations can be performed and managed hourly, for example, which is beneficial to fraud applications.

Figure 4:
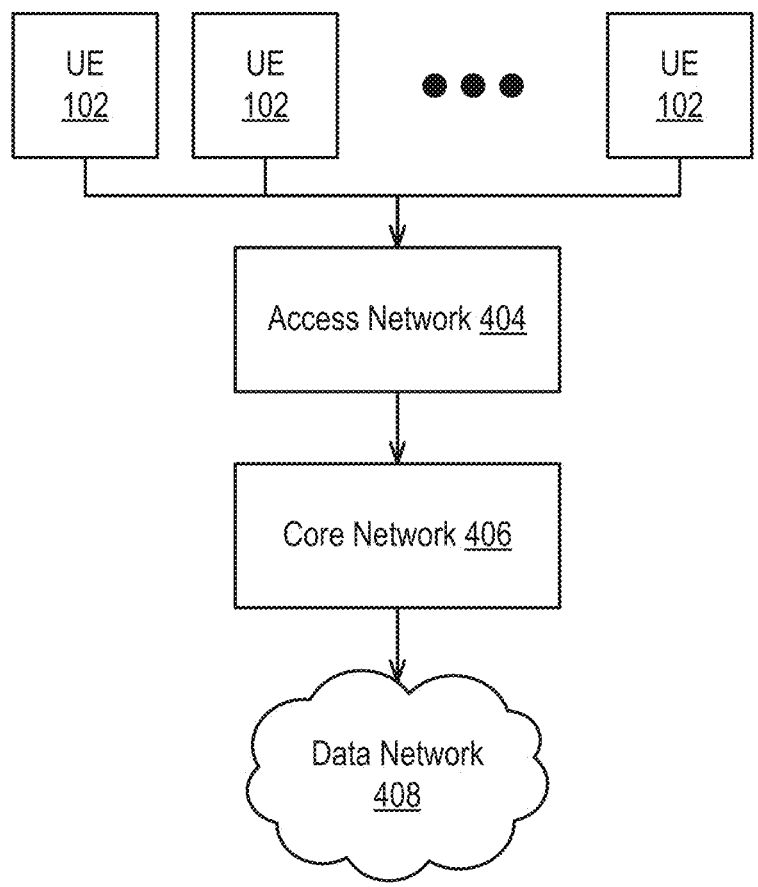
FIG. 4 illustrates a non-limiting example embodiment of a network architecture according to some embodiments of the present disclosure.

FIG. 4 is a block diagram of an example network architecture according to some embodiments of the present disclosure. In the illustrated embodiment, UE 102 accesses a data network 408 via an access network 404 and a core network 406.

In the illustrated embodiment, the access network 404 comprises a network allowing network communication with UE 102. In general, the access network 404 includes at least one base station that is communicatively coupled to the core network 406 and coupled to zero or more UE 102.

In some embodiments, the access network 404 comprises a cellular access network, for example, a 5G network. In an embodiment, the access network 404 can include a NextGen Radio Access Network (NG-RAN). In an embodiment, the access network 404 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 404 provides access to a core network 406 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 406 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 406 and to external network-attached elements in a data network 408 such as the Internet.

In the illustrated embodiment, the access network 404 and the core network 406 are operated by a NO. However, in some embodiments, the networks (404, 406) may be operated by a private entity and may be closed to public traffic. For example, the components of the network 406 may be provided as a single device, and the access network 404 may comprise a small form-factor base station. In these embodiments, the operator of the device can simulate a cellular network, and UE 102 can connect to this network similar to connecting to a national or regional network.

In some embodiments, the access network 404, core network 406 and data network 408 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 5:
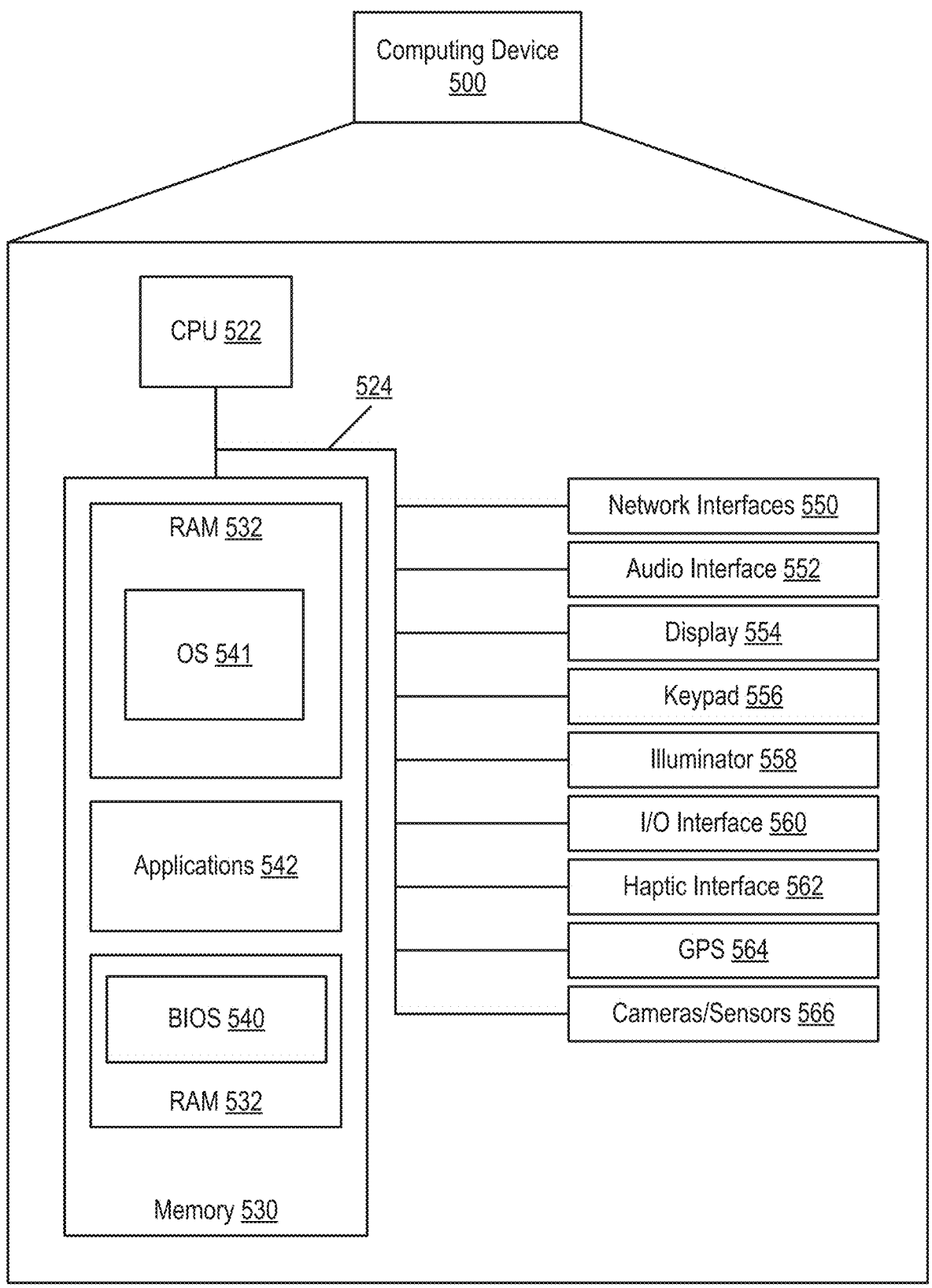
FIG. 5 is a block diagram illustrating a computing device showing an example of a client or server device used in various embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a CPU 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may be a liquid crystal display (LCD), gas plasma, light-emitting diode (LED), or any other type of display used with a computing device. Display 554 may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:
    initiating a job via a state machine, the job being a data structure that comprises job information related to a source of data, a job identifier (ID), a batch ID and destination location;
    extracting, from a data source corresponding to the source of the data, data related to the job, the job data corresponding to the job ID and the batch ID;
    inserting, based on the extraction of the job data, records from the data source into a records table, the records table further comprising the batch ID;
    transforming the records within the records table into a format associated with a data store corresponding to the destination location; and
    loading the transformed records into the data store of the destination location.

2. The method of claim 1, further comprising:
    enabling, over a network, a fraud system access to the loaded records, the fraud system provided with functionality for performing an audit on the loaded records.

3. The method of claim 1, further comprising:
    analyzing the records in the records table;
    determining an error within the records; and
    generating an error log comprising information related to the determined error.

4. The method of claim 3, wherein operation of the extraction is reperformed upon determination of the error.

5. The method of claim 1, further comprising:
    proceeding to a next batch of records upon completion of extraction of the job data, wherein records associated with a next job are populated in new rows in the records table for transformation and loading.

6. The method of claim 1, further comprising:
   inserting the job data into a batch table based on the extraction of the job data.

7. The method of claim 1, wherein the records table is a transient table.

8. The method of claim 1, wherein the data source corresponding to the source of data corresponds to at least one of a database, flat files, application program interface (API), cloud service, streaming source, and cell tower log.

9. A system comprising:
   a processor configured to:
      initiate a job, the job being a data structure that comprises job information related to a source of data, a job identifier (ID), a batch ID and destination location;
      extract, from a data source corresponding to the source of the data, data related to the job, the job data corresponding to the job ID and the batch ID;
      insert, based on the extraction of the job data, records from the data source into a records table, the records table further comprising the batch ID;
      transform the records within the records table into a format associated with a data store corresponding to the destination location; and
      load the transformed records into the data store of the destination location.

10. The system of claim 9, wherein the processor is further configured to:
   enable, over a network, a fraud system access to the loaded records, the fraud system provided with functionality for performing an audit on the loaded records.

11. The system of claim 9, wherein the processor is further configured to:
   analyze the records in the records table;
   determine an error within the records; and
   generate an error log comprising information related to the determined error, wherein operation of the extraction is reperformed upon determination of the error.

12. The system of claim 9, wherein the processor is further configured to:
   proceed to a next batch of records upon completion of extraction of the job data, wherein records associated with a next job are populated in new rows in the records table for transformation and loading.

13. The system of claim 9, wherein the processor is further configured to:
   insert the job data into a batch table based on the extraction of the job data.

14. The system of claim 9, wherein the records table is a transient table.

15. The system of claim 9, wherein the data source corresponding to the source of data corresponds to at least one of a database, flat files, application program interface (API), cloud service, streaming source, and cell tower log.

16. A non-transitory computer-readable storage medium tangibly encoded with computer-executable instructions, that when executed by a processor, perform a method comprising:
   initiating a job, the job being a data structure that comprises job information related to a source of data, a job identifier (ID), a batch ID and destination location;
   extracting, from a data source corresponding to the source of the data, data related to the job, the job data corresponding to the job ID and the batch ID;
   inserting, based on the extraction of the job data, records from the data source into a records table, the records table further comprising the batch ID;
   transforming the records within the records table into a format associated with a data store corresponding to the destination location; and
   loading the transformed records into the data store of the destination location.

17. The non-transitory computer-readable storage medium of claim 16, further comprising:
   enabling, over a network, a fraud system access to the loaded records, the fraud system provided with functionality for performing an audit on the loaded records.

18. The non-transitory computer-readable storage medium of claim 16, further comprising:
   analyzing the records in the records table;
   determining an error within the records; and
   generating an error log comprising information related to the determined error, wherein operation of the extraction is reperformed upon determination of the error.

19. The non-transitory computer-readable storage medium of claim 16, further comprising:
   proceeding to a next batch of records upon completion of extraction of the job data, wherein records associated with a next job are populated in new rows in the records table for transformation and loading.

20. The non-transitory computer-readable storage medium of claim 16, further comprising:
   inserting the job data into a batch table based on the extraction of the job data.

* * * * *